United States Patent
Riggs et al.

(10) Patent No.: US 10,556,195 B2
(45) Date of Patent: Feb. 11, 2020

(54) FLUID REMOVAL APPARATUS FOR USE WITH A WEIR TANK

(71) Applicant: White's Equipment Rental, LLC, Woodward, OK (US)

(72) Inventors: Billy R. Riggs, Woodward, OK (US); Christopher L. Kuykendall, Hobbs, NM (US)

(73) Assignee: White's Equipment Rental, LLC, Woodward, OK (US)

( * ) Notice: Subject to any disclaimer, the term of this patent is extended or adjusted under 35 U.S.C. 154(b) by 977 days.

(21) Appl. No.: 14/983,127

(22) Filed: Dec. 29, 2015

(65) Prior Publication Data

US 2017/0182434 A1 Jun. 29, 2017

(51) Int. Cl.
| | |
|---|---|
| *B01D 21/24* | (2006.01) |
| *B67D 7/78* | (2010.01) |
| *B01D 21/00* | (2006.01) |
| *B01D 21/02* | (2006.01) |
| *B03D 1/14* | (2006.01) |
| *E21B 21/06* | (2006.01) |
| *B67D 7/02* | (2010.01) |
| *B67D 7/62* | (2010.01) |
| *B67D 7/40* | (2010.01) |

(52) U.S. Cl.
CPC ....... *B01D 21/2444* (2013.01); *B01D 21/003* (2013.01); *B01D 21/0024* (2013.01); *B01D 21/0036* (2013.01); *B67D 7/0288* (2013.01); *B67D 7/406* (2013.01); *B67D 7/62* (2013.01); *B67D 7/78* (2013.01); *E21B 21/065* (2013.01); *B01D 21/10* (2013.01); *B01D 21/245* (2013.01); *B01D 21/2427* (2013.01); *B01D 21/2483* (2013.01); *B03D 1/1462* (2013.01); *B03D 1/1468* (2013.01)

(58) Field of Classification Search
CPC .. B01D 21/2444; B01D 21/0036; B67D 7/78; B67D 7/406; B67D 7/0288; B67D 7/62; E21B 21/065; B03D 1/1468; B03D 1/028; B03D 1/082; B03D 1/1406; B03D 1/1462; B03D 1/1475; B03D 1/22; B03D 1/245

See application file for complete search history.

(56) References Cited

U.S. PATENT DOCUMENTS

| | | | | |
|---|---|---|---|---|
| 1,389,674 | A * | 9/1921 | Lyons | B03B 11/00 |
| | | | | 209/169 |
| 4,028,229 | A * | 6/1977 | Dell | B03D 1/22 |
| | | | | 209/164 |
| 2003/0094422 | A1* | 5/2003 | Perkins | A23B 4/24 |
| | | | | 210/764 |

\* cited by examiner

*Primary Examiner* — Lucas A Stelling
*Assistant Examiner* — Angel Olivera
(74) *Attorney, Agent, or Firm* — Hall Estill Law Firm (57) ABSTRACT

A separation apparatus that includes a weir tank having a plurality of cells and fluid removal apparatus for each cell to remove the fluid from each cell. The fluid removal apparatus includes an actuator and an extension arm whose movement is caused by the actuator. In addition to the actuator and the extension arm, the fluid removal apparatus includes a plunger attached to the extension arm for selectively engaging a first opening in each cell. Furthermore, a method of removing fluid from the separation apparatus via the fluid removal apparatus.

15 Claims, 7 Drawing Sheets

FLUID REMOVAL APPARATUS FOR USE WITH A WEIR TANK

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE DISCLOSURE

1. Field of the Invention

The present disclosure relates to a fluid management system comprised of a fluid removal apparatus for use with a weir tank to allow for removal of fluids and/or sediment from the weir tank.

2. Description of the Related Art

Spent drilling material recovered from an oil and gas well can be processed in various manners to try and separate out the primarily aqueous portion. One manner of separating the aqueous portion from the spent drilling materials includes the use of a weir tank. Removing fluids from a weir tank can sometimes be difficult and time consuming.

Accordingly, there is a need for an apparatus to be used with a weir tank to make the removal of fluids from the weir tank easier.

SUMMARY OF THE DISCLOSURE

The disclosure of this application is directed to a separation apparatus that includes a weir tank having a plurality of cells and fluid removal apparatus for each cell to remove the fluid from each cell. The fluid removal apparatus includes an actuator and an extension arm whose movement is caused by the actuator. In addition to the actuator and the extension arm, the fluid removal apparatus includes a plunger attached to the extension arm for selectively engaging a first opening in each cell. Furthermore, the disclosure is directed to a method of removing fluid from the separation apparatus via the fluid removal apparatus.

DETAILED DESCRIPTION OF THE DISCLOSURE

Figure 1:
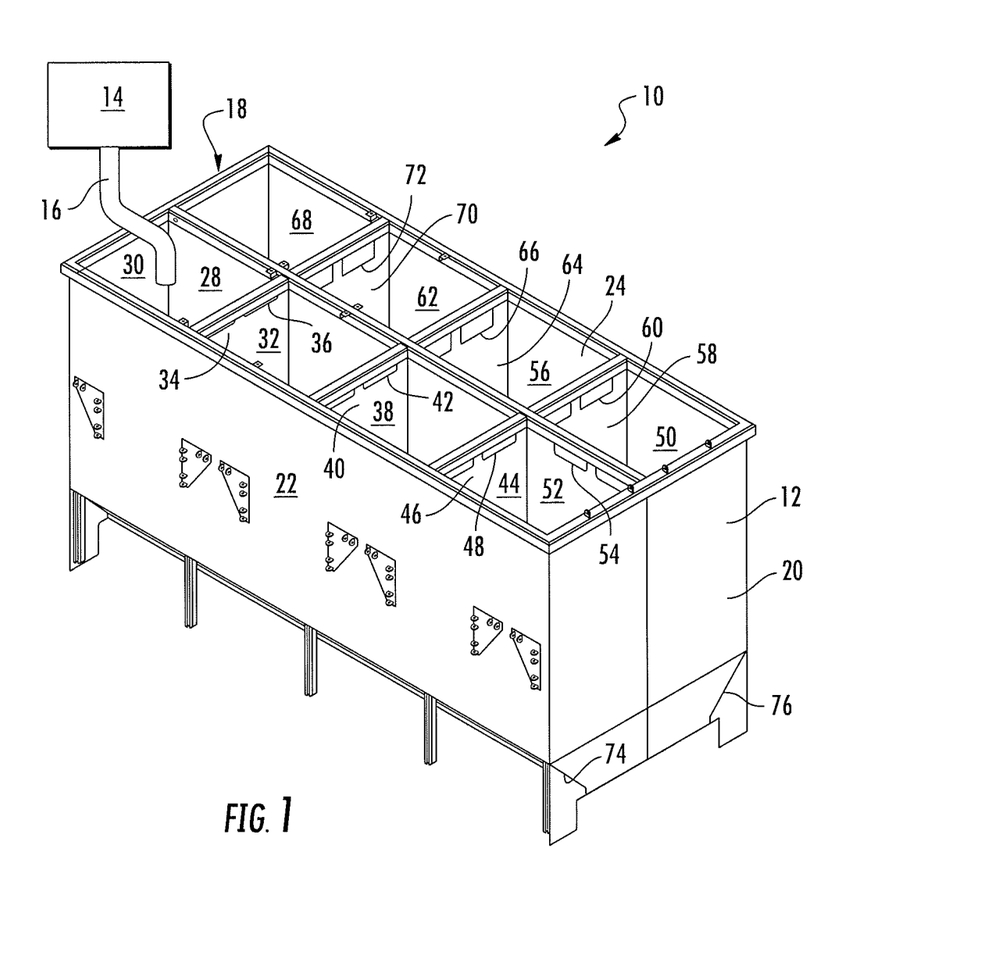
FIG. 1 is a perspective view of a weir tank constructed in accordance with the present disclosure.
Figure 2:
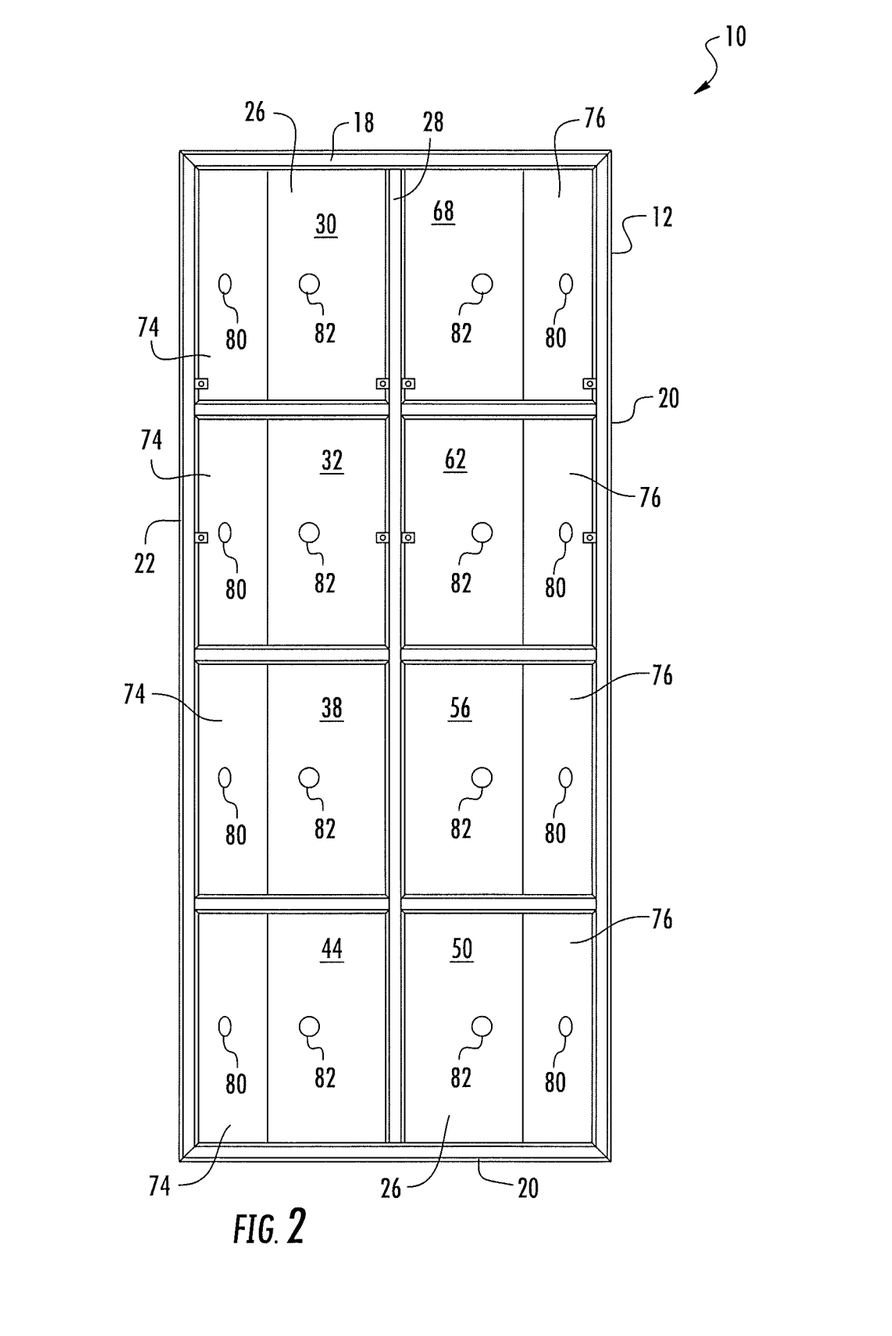
FIG. 2 is a top plan view of the weir tank constructed in accordance with the present disclosure.
Figure 3:
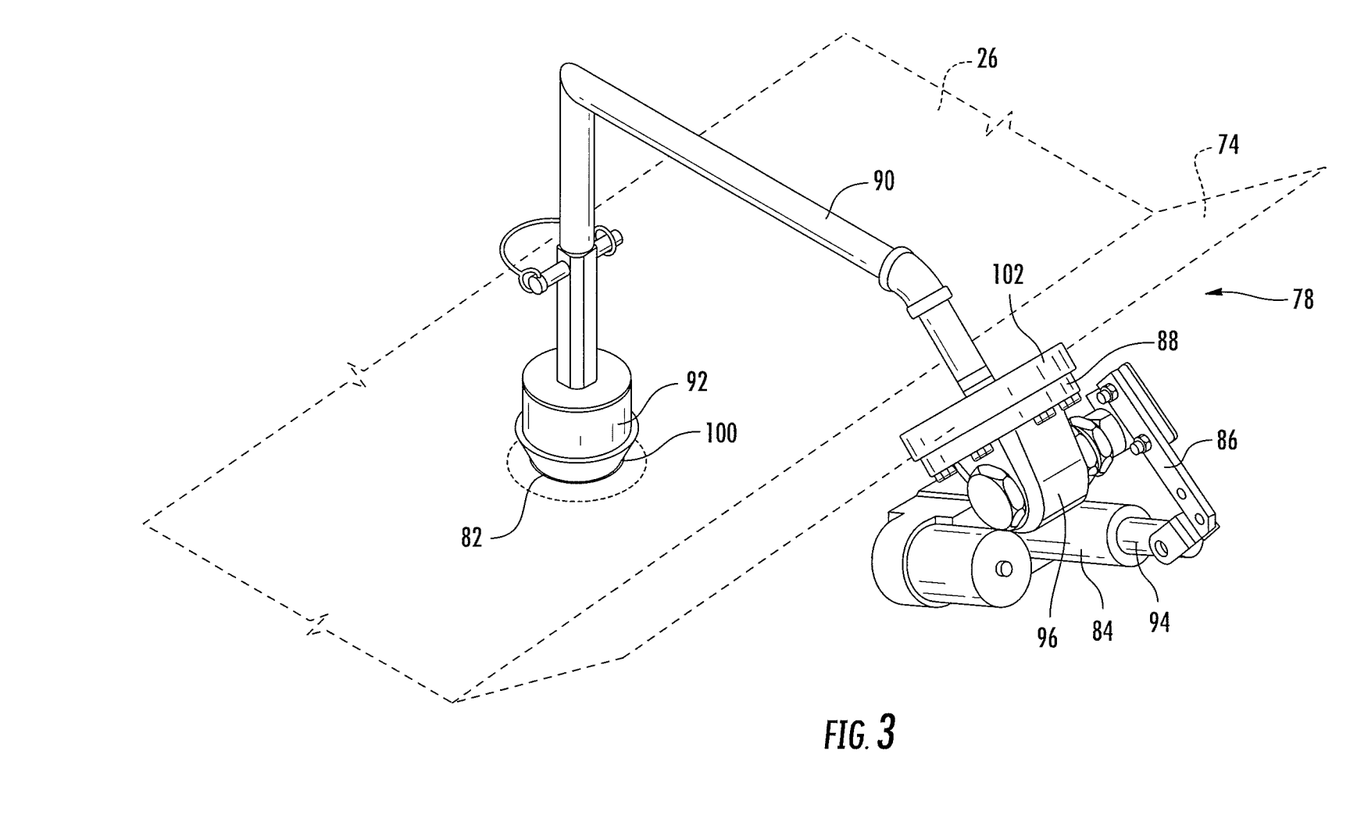
FIG. 3 is a perspective view of a fluid removal apparatus constructed in accordance with the present disclosure.
Figure 4:
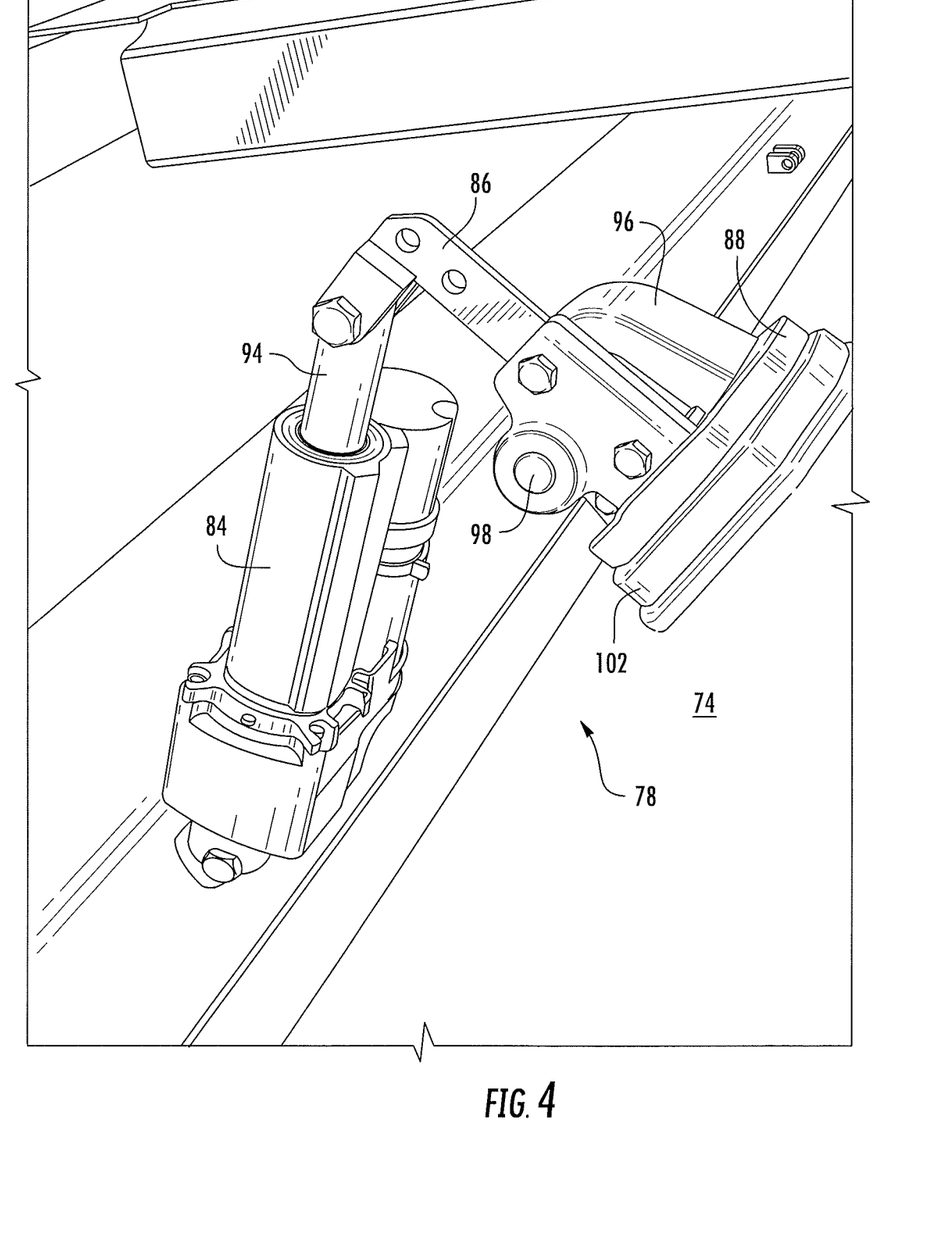
FIG. 4 is a perspective view of a portion of the fluid removal apparatus shown in FIG. 3 in a first position and constructed in accordance with the present disclosure.
Figure 5:
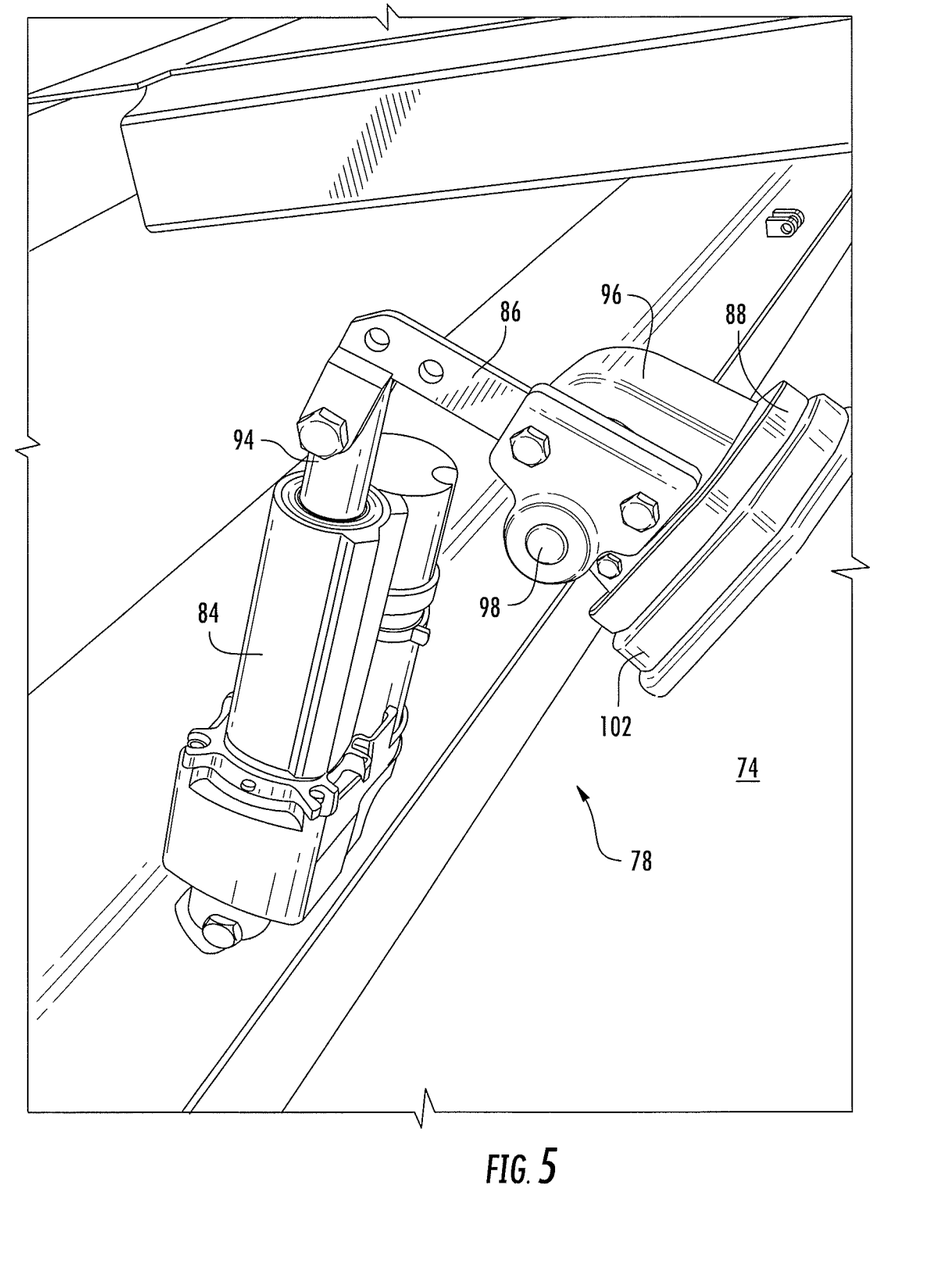
FIG. 5 is a perspective view of the portion of the fluid removal apparatus shown in FIG. 4 in a second position and constructed in accordance with the present disclosure.
Figure 6:
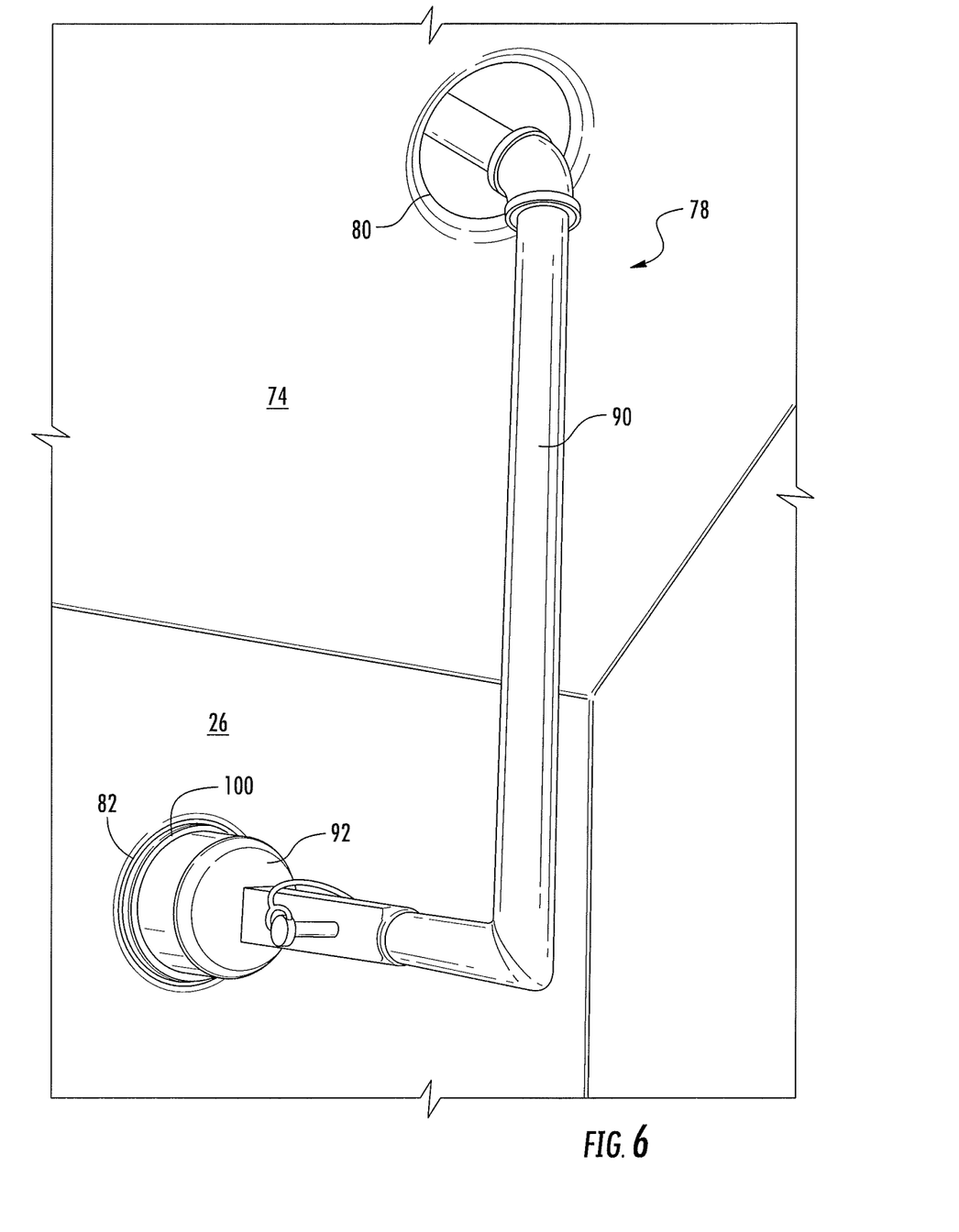
FIG. 6 is a perspective view of a portion of the fluid removal apparatus shown in FIG. 3 in a first position and constructed in accordance with the present disclosure.
Figure 7:
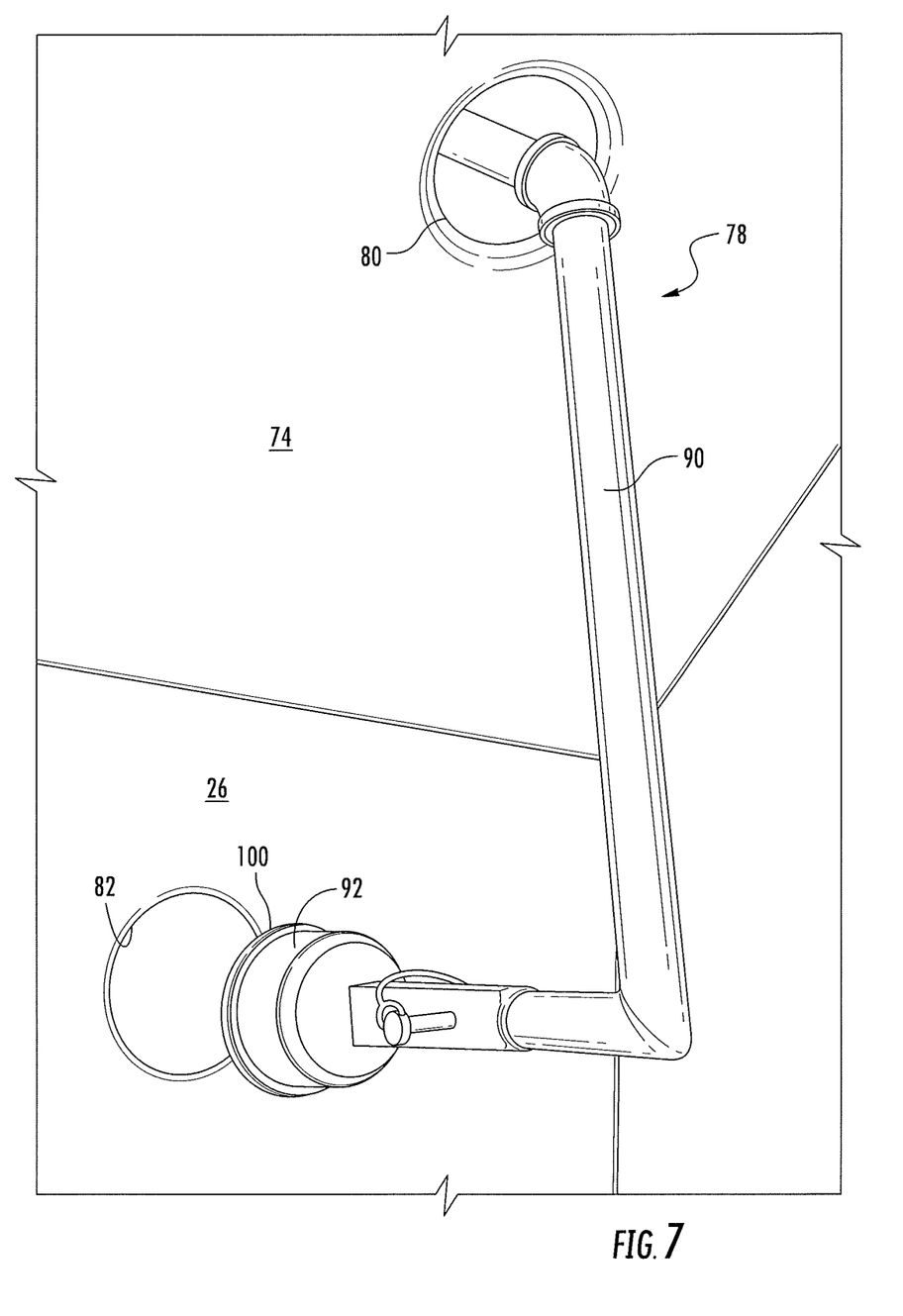
FIG. 7 is a perspective view of the portion of the fluid removal apparatus shown in FIG. 6 in a second position and constructed in accordance with the present disclosure.

Referring to FIGS. 1-2, there is shown a fluid management system 10 for processing various byproducts of spent drilling materials from an oil and gas operation. The byproducts of the spent drilling materials consist primarily of a mixture of a solid component and a liquid component wherein the liquid component is primarily water. The fluid management system 10 can include a weir tank 12 for separating the solid component of the spent drilling materials byproducts from the liquid component of the spent drilling materials byproducts, or purifying the liquid component of the spent drilling materials byproducts. The spent drilling materials byproducts can be provided to the weir tank 12 from a byproduct supply 14 via a conduit 16. The byproduct supply 14 can be any source of spent drilling materials byproducts known in the art.

The weir tank 12 includes a first end 18, a second end 20, a first side 22 and a second side 24 to provide an outer vertical perimeter of the weir tank 12. The weir tank 12 also includes a bottom portion 26 that supports and cooperates with the first end 18, the second end 20, the first side 22 and the second side 24 to create a total outer perimeter of the weir tank 12. In one embodiment, the weir tank 12 can include a divider plate 28 that extends vertically from the bottom portion 26 and extends from the first end 18 to the second end 20 of the weir tank 12.

The weir tank 12 can be any type of weir tank known in the art having multiple cells for separating liquid from solids, or purifying the liquid portion of a mixture of liquids and solids. In one embodiment, the weir tank 12 includes a first cell 30 for receiving the spent drilling materials byproducts from the byproduct supply 14. The weir tank 12 also includes a second cell 32 positioned adjacent to the first cell 30. The second cell 32 is separated from the first cell 30 by a first separation wall 34. The first separation wall 34 includes an opening 36 disposed therein to permit fluid to flow from the first cell 30 into the second cell 32 when the fluid reaches a specific height H above the bottom portion 26 of the weir tank 12.

The weir tank 12 can also include a third cell 38 positioned adjacent to the second cell 32. The third cell 38 is separated from the second cell 32 by a second separation wall 40. The second separation wall 40 includes an opening 42 disposed therein to permit fluid to flow from the second cell 32 into the third cell 38 when the fluid reaches a specific height H-X above the bottom portion 26 of the weir tank 12. X is the distance that the opening 42 is lower than the opening 36 in the first separation wall 34. Furthermore, the weir tank 12 can also include a fourth cell 44 positioned adjacent to the third cell 38. The fourth cell 44 is separated from the third cell 38 by a third separation wall 46. The third separation wall 46 includes an opening 48 disposed therein to permit fluid to flow from the third cell 38 into the fourth cell 44 when the fluid reaches a specific height H-2X above the bottom portion 26 of the weir tank 12.

The weir tank 12 can also include a fifth cell 50 positioned adjacent to the fourth cell 44. The fifth cell 50 is separated from the fourth cell 44 by a portion 52 of the divider plate 28. The portion 52 of the divider plate 28 includes an opening 54 disposed therein to permit fluid to flow from the fourth cell 44 into the fifth cell 50 when the fluid reaches a specific height H-3X above the bottom portion 26 of the weir tank 12. Furthermore, the weir tank 12 can also include a sixth cell 56 positioned adjacent to the fifth cell 50. The sixth cell 56 is separated from the fifth cell 50 by a fourth separation wall 58. The fourth separation wall 58 includes an opening 60 disposed therein to permit fluid to flow from the fifth cell 50 into the sixth cell 56 when the fluid reaches a specific height H-4X above the bottom portion 26 of the weir tank 12.

The weir tank 12 can also include a seventh cell 62 positioned adjacent to the sixth cell 56. The seventh cell 62 is separated from the sixth cell 56 by a fifth separation wall 64. The fifth separation wall 64 includes an opening 66 disposed therein to permit fluid to flow from the sixth cell 56 into the seventh cell 62 when the fluid reaches a specific height H-5X above the bottom portion 26 of the weir tank 12. Furthermore, the weir tank 12 can also include an eighth cell 68 positioned adjacent to the seventh cell 62. The eighth cell 68 is separated from the seventh cell 62 by a sixth separation wall 70. The sixth separation wall 70 includes an opening 72 disposed therein to permit fluid to flow from the seventh cell 62 into the eighth cell 68 when the fluid reaches a specific height H-6X above the bottom portion 26 of the weir tank 12. In a further embodiment, the first cell 30 is positioned adjacent to the eighth cell 68, the second cell 32 is positioned adjacent to the seventh cell 62, and the third cell 38 is positioned adjacent to the sixth cell 56.

The openings 36, 42, 48, 54, 60, 66 and 72 described herein can be comprised of multiple openings or be just a single opening. The openings 36, 42, 48, 54, 60, 66 and 72 can include the same height and be positioned to meet the requirements described herein or the top of each opening 36, 42, 48, 54, 60, 66 and 72 can be stationary and the lower part of each opening 36, 42, 48, 54, 60, 66 and 72 can be lowered to meet the requirements described herein, thus the openings 36, 42, 48, 54, 60, 66 and 72 increase in size in the vertical direction.

In another embodiment of the present disclosure, the bottom portion 26 includes a first angled portion 74 that transitions from the bottom portion 26 to the first side 22 of the weir tank 12. Furthermore, the bottom portion 26 can also include a second angled portion 76 that transitions from the bottom portion 26 to the second side 24 of the weir tank 12.

Referring now to FIGS. 3-7, the fluid management system 10 further includes a fluid removal apparatus 78 supported by the weir tank 12 for controlling the removal of the liquid component and the solid component of the spent drilling materials byproducts from the cells 30, 32, 38, 44, 50, 56, 62 and 68 of the weir tank 12. The fluid removal apparatus 78 can extend through a first opening 80 disposed in each cell 30, 32, 38, 44, 50, 56, 62 or 68 to selectively control the removal of fluid through a second opening 82 disposed in each cell 30, 32, 38, 44, 50, 56, 62 or 68. The first opening 80 can be disposed anywhere on the cells 30, 32, 38, 44, 50, 56, 62 and 68 such that the fluid removal apparatus 78 can access the second opening 82 disposed in the bottom portion 26 of the weir tank 12. In one embodiment, the first opening 80 is disposed in the first or second angled portion 74 or 76 of the weir tank 12 depending upon which cell 30, 32, 38, 44, 50, 56, 62 and 68 the fluid removal apparatus 78 is incorporated in.

The fluid removal apparatus 78 includes an actuator 84 to provide movement to the fluid removal apparatus 78, a linkage assembly 86 for transferring mechanical movement from the actuator 84 to a transition apparatus 88 mounted in the first opening 80 in the cells 30, 32, 38, 44, 50, 56, 62 or 68 to transfer the movement of the linkage assembly 86 to an extension arm 90 having a plunger 92 attached thereto for engaging the second opening 82 in the cell 30, 32, 38, 44, 50, 56, 62 or 68. The actuator 84 can be secured to any part of the weir tank 12.

The actuator 84 can extend or retract a driving element 94 that is rotatably connected to a first end of the linkage assembly 86. A second end of the linkage assembly 86 is supported by the transition apparatus 88. In one embodiment, the transition apparatus 88 includes a housing 96 with a pivot rod 98 extending within the housing 96 and outside of the housing 96. In this embodiment, the second end of the linkage assembly 86 is rotatably connected to the pivot rod 98 extending from the housing 96 of the transition apparatus 88. As the pivot rod 98 is rotated by the linkage assembly 86 and the actuator 84, the rotation of the pivot rod 98 is then transferred to the extension arm 90, which raises and lowers the plunger 92 in and out of the second opening 82. The extension arm 90 can have any size, shape, length, etc., such that when the driving element 94 is actuated, the plunger 92 can seal the second opening 82 in a first position and allow fluids to flow through the second opening 82 in a second position. The plunger 92 can include a sealing element 100 to prevent fluids from passing through the second opening 82 when the plunger 92 is in the first position.

The transition apparatus 88 can also include a sealing element 102 positioned adjacent to the weir tank 12 to prevent fluid from escaping the first opening 82. Furthermore, the transition apparatus 88 can include further sealing members to prevent fluids from escaping the cells 30, 32, 38, 44, 50, 56, 62 and 68 unless desired. It should be understood and appreciated that the linkage assembly 86 can include any number of parts such that the movement of the driving element 94 is transferred, ultimately, to the plunger 92.

In use, the actuator 84 extends the driving element 94 away from the actuator 84, which forces the first end of the linkage assembly 86 to move and rotate the pivot rod 98 supported on the second end of the linkage assembly 86. The rotation of the pivot rod 98 via the extension of the driving element 94 forces the extension arm 90 to force the plunger 92 into the second opening 82 and preventing fluid from escaping the cells 30, 32, 38, 44, 50, 56, 62 and 68 of the weir tank 12.

When it is desirable to have fluid removed from a given cell 30, 32, 38, 44, 50, 56, 62 or 68, the actuator 84 retracts the driving element 94. The retraction of the driving element 94 by the actuator 84 reverses the rotation of the pivot rod 98, thus raising the plunger 92 out of the second opening 82. This permits fluid to flow out of the cells 30, 32, 38, 44, 50, 56, 62 and 68 of the weir tank 12.

In another embodiment of the disclosure, a method for managing fluids of the weir tank 12 is provided. When desirable, any fluid removal apparatus 78 of any individual cell 30, 32, 38, 44, 50, 56, 62 or 68 can be activated to remove the fluid in that respective cell 30, 32, 38, 44, 50, 56, 62 or 68. The removed fluid can be sent back for further processing and be resupplied to the byproduct supply 14 or be sent to a clean water supply for further uses.

From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A separation apparatus, the apparatus comprising:
a weir tank having a plurality of cells;
a fluid removal apparatus for each cell to remove the fluid from each cell, the fluid removal apparatus comprising:
an actuator;
an extension arm whose movement is caused by the actuator; and
a plunger attached to the extension arm for selectively engaging a first opening in each cell;
a first opening disposed in a bottom portion of each cell of the weir tank; and
a second opening disposed in each cell of the weir tank, the second opening is disposed in an angled portion disposed between the bottom portion of the weir tank and a side of the weir tank; wherein the fluid removal apparatus engages the first and second opening disposed in each cell of the weir tank.

2. The separation apparatus of claim 1 wherein the fluid removal apparatus further comprises a linkage assembly to transfer movement of the actuator to the extension arm.

3. The separation apparatus of claim 2 wherein the fluid removal apparatus further comprises a driving element that can be extended or retracted by the actuator and a transition apparatus disposed adjacent to the second opening and between the linkage assembly and the extension arm.

4. The separation apparatus of claim 3 wherein the transition apparatus includes a housing for encompassing a portion of a pivot rod, the pivot rod extending from the housing engages one end of the linkage assembly and the portion of the pivot rod inside the housing engages one end of the extension arm opposite the plunger.

5. The separation apparatus of claim 1 wherein the plunger further comprises a sealing element for preventing the flow of fluid from the first opening in the weir tank unless desired.

6. The separation apparatus of claim 4 further comprising a sealing element disposed between the housing and the side of the weir tank.

7. A method, the method comprising:
removing fluid from a separation apparatus, the separation apparatus comprising:
a weir tank having a plurality of cells;
a fluid removal apparatus for each cell to remove the fluid from each cell, the fluid removal apparatus comprising:
an actuator;
an extension arm whose movement is caused by the actuator; and
a plunger attached to the extension arm for selectively engaging a first opening in each cell;
a first opening disposed in a bottom portion of each cell of the weir tank; and
a second opening disposed in each cell of the weir tank, the second opening is disposed in an angled portion disposed between the bottom portion of the weir tank and a side of the weir tank; wherein the fluid removal apparatus engages the first and second opening disposed in each cell of the weir tank.

8. The method of claim 7 wherein the fluid removal apparatus further comprises a linkage assembly to transfer movement of the actuator to the extension arm.

9. The method of claim 8 wherein the fluid removal apparatus further comprises a driving element that can be extended or retracted by the actuator and a transition apparatus disposed adjacent to the second opening and between the linkage assembly and the extension arm.

10. The method of claim 9 wherein the transition apparatus includes a housing for encompassing a portion of a pivot rod, the pivot rod extending from the housing engages one end of the linkage assembly and the portion of the pivot rod inside the housing engages one end of the extension arm opposite the plunger.

11. The method of claim 7 wherein the plunger further comprises a sealing element for preventing the flow of fluid from the first opening in the weir tank unless desired.

12. The method of claim 10 further comprising a sealing element disposed between the housing and the side of the weir tank.

13. The method of claim 7 further comprising the step of stopping the flow of fluid out of the separation apparatus.

14. The method of claim 7 further comprising the step of directing the fluid withdrawn from the separation apparatus to a byproduct supply for further processing.

15. The method of claim 7 further comprising the step of directing the fluid withdrawn from the separation apparatus to a clean water supply.

* * * * *